US011917554B2

(12) United States Patent
Musante et al.

(10) Patent No.: US 11,917,554 B2
(45) Date of Patent: Feb. 27, 2024

(54) ORIENTATION BASED TRANSMISSION POWER

(71) Applicant: Juniper Networks, Inc., Sunnyvale, CA (US)

(72) Inventors: John James Musante, Holtsville, NY (US); Gurpreet Singh, San Francisco, CA (US); Joshua Rosenthal, San Jose, CA (US); James Jay Friedmann, Canton, OH (US)

(73) Assignee: Juniper Networks, Inc., Sunnyvale, CA (US)

( * ) Notice: Subject to any disclaimer, the term of this patent is extended or adjusted under 35 U.S.C. 154(b) by 122 days.

(21) Appl. No.: 17/195,968

(22) Filed: Mar. 9, 2021

(65) Prior Publication Data
US 2022/0295420 A1 Sep. 15, 2022

(51) Int. Cl.
*H04B 7/185* (2006.01)
*H04W 52/28* (2009.01)
*H04W 52/22* (2009.01)
*H04W 52/36* (2009.01)

(52) U.S. Cl.
CPC ......... *H04W 52/283* (2013.01); *H04W 52/22* (2013.01); *H04W 52/367* (2013.01)

(58) Field of Classification Search
CPC . H04W 52/283; H04W 52/22; H04W 52/367; H04W 52/42; H04W 52/24; H04W 52/50; H04W 52/16; H04W 52/12; H04W 52/146; H04B 17/12
See application file for complete search history.

(56) References Cited

U.S. PATENT DOCUMENTS

| 10,374,779 | B2* | 8/2019 | Pajona | H04L 5/0057 |
| 11,134,447 | B2* | 9/2021 | Dou | H04W 52/40 |
| 2004/0152420 | A1* | 8/2004 | Redi | H04W 52/10 |
| | | | | 455/67.14 |
| 2007/0197254 | A1* | 8/2007 | Borran | H04W 52/243 |
| | | | | 455/522 |
| 2008/0056177 | A1* | 3/2008 | Mori | H04W 52/04 |
| | | | | 370/318 |
| 2010/0056163 | A1* | 3/2010 | Schmidt | H04W 16/18 |
| | | | | 455/446 |
| 2011/0319122 | A1* | 12/2011 | Zhou | H04W 52/242 |
| | | | | 455/522 |
| 2012/0021788 | A1* | 1/2012 | Yavuz | H04B 17/24 |
| | | | | 455/501 |
| 2012/0039265 | A1* | 2/2012 | Patel | H04W 52/325 |
| | | | | 370/329 |
| 2012/0046026 | A1* | 2/2012 | Chande | H04W 52/18 |
| | | | | 455/422.1 |
| 2012/0270519 | A1* | 10/2012 | Ngai | H04W 52/226 |
| | | | | 455/404.1 |

(Continued)

*Primary Examiner* — Phuongchau Ba Nguyen
(74) *Attorney, Agent, or Firm* — Shumaker & Sieffert, P.A.

(57) ABSTRACT

Disclosed are embodiments of a device that includes an orientation sensor. Based on the device's orientation, a transmit power of the device is limited to ensure that transmission of the device do not exceed regulatory requirements. The transmit power limit is based, in some embodiments, on a manufacturer or model of the device, which indicates a position of one or more antennas relative to the device, and allows for a determination of an amount of power transmitted above the horizon in a given orientation.

18 Claims, 8 Drawing Sheets

(56) References Cited

U.S. PATENT DOCUMENTS

| | | | |
|---|---|---|---|
| 2013/0107801 A1* | 5/2013 | Zheng | H04W 52/288 |
| | | | 370/328 |
| 2014/0248921 A1* | 9/2014 | Hanaoka | H04W 52/44 |
| | | | 455/522 |
| 2018/0062684 A1* | 3/2018 | Kim | H04W 52/283 |
| 2018/0191422 A1* | 7/2018 | Xia | H04B 7/061 |
| 2018/0302862 A1* | 10/2018 | Takata | H04W 52/247 |
| 2020/0295852 A1* | 9/2020 | Butcher | H04B 17/11 |
| 2020/0314659 A1* | 10/2020 | Hannan | H04W 72/0453 |
| 2020/0336989 A1* | 10/2020 | Rong | H04W 52/246 |
| 2021/0006987 A1* | 1/2021 | Sugaya | H04W 52/24 |
| 2021/0029650 A1* | 1/2021 | Cirik | H04W 52/146 |
| 2021/0391916 A1* | 12/2021 | Singh | H04B 17/318 |

\* cited by examiner

ORIENTATION BASED TRANSMISSION POWER

TECHNICAL FIELD

This application is generally directed to determining a transmission power based on a device orientation. In some instances, the disclosed methods are applied to wireless access points to avoid exceeding regulatory requirements.

BACKGROUND

The use of wireless networks is expanding to include additional use cases. For example, to reduce the cost of providing cellular phone service, many cell phone provides are looking to route phone data over a Wi-Fi network whenever possible. Thus, utilization of more costly cellular networks could be reduced to only those situations where no Wi-Fi network is available. Because of the heavy utilization of Wi-Fi networks, various regulatory bodies have been allocating additional frequency spectrum to Wi-Fi networks. However, as the utilization of Wi-Fi networks increase, it is important to ensure Wi-Fi networks can operate without interfering with other uses of the radio spectrum.

BRIEF DESCRIPTION OF THE DRAWINGS

The present disclosure is illustrated by way of example and not limitation in the FIGS. of the accompanying drawings, in which like references indicate similar elements and in which.

DETAILED DESCRIPTION

Figure 1:
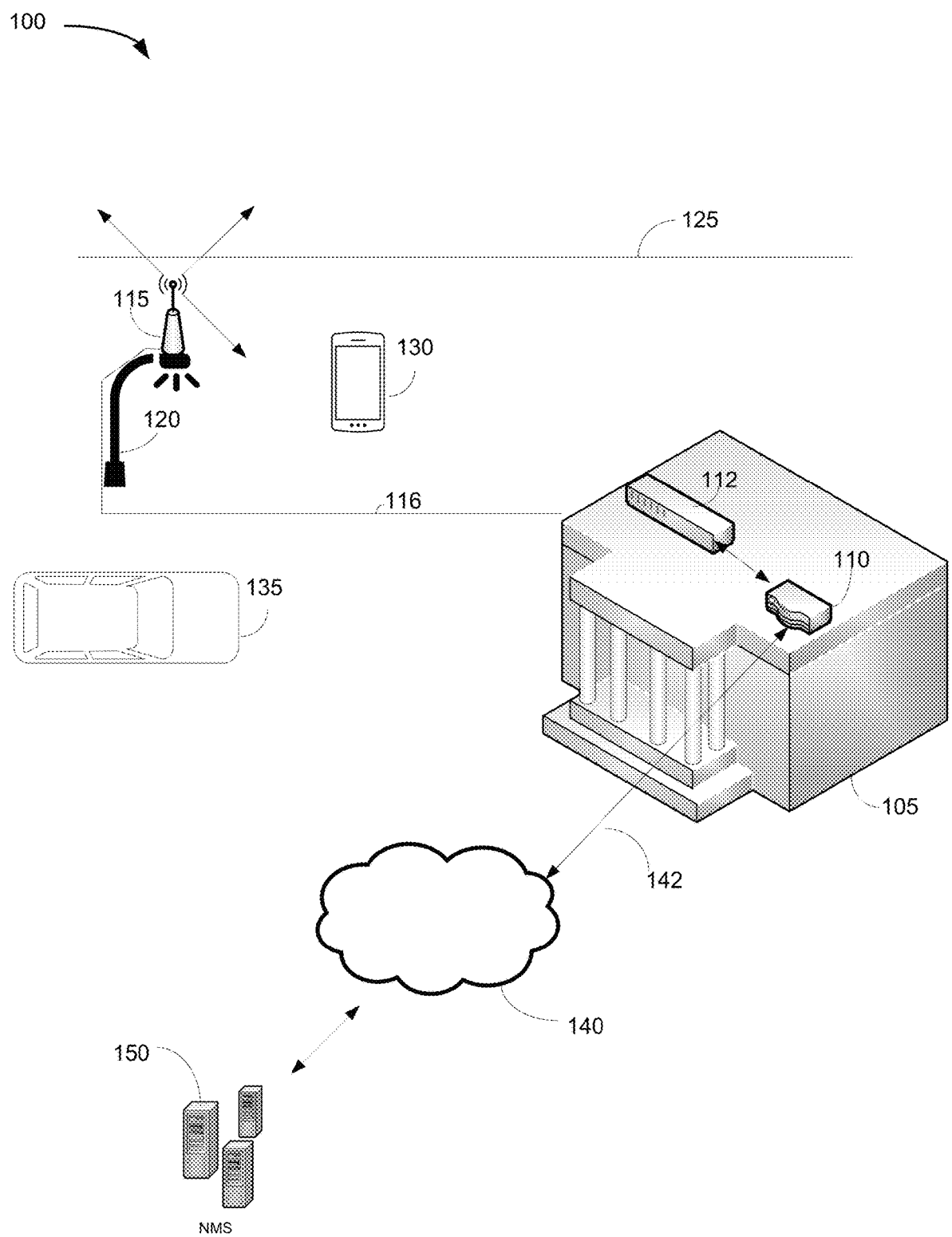
FIG. 1 is an overview diagram of an example environment implementing one or more of the disclosed embodiments.

As discussed above, wireless networks, and more specifically, Wi-Fi networks have become a critical portion of our communications infrastructure. One trend that has emerged recently is an increasing instance of Wi-Fi access points being deployed in an outdoor setting. In some cases, these Wi-Fi access points are increasingly being used as a substitute for more costly cellular networks. To accommodate the increasing demands being placed on Wi-Fi networks, some radio frequency spectrum is being re-purposed for use by Wi-Fi networks. For example, some spectrum previously allocated to satellite operators has been reassigned for use by Wi-Fi networks. This re-purposing of radio spectrum presents some risk that Wi-Fi networks may interference with other communications equipment that continues to operate over and use the older spectrum allocations.

To reduce the risk of such interference, radio transmissions are regulated by the Federal Communications Commission in the United States. Other countries also regulate radio transmissions. Radio transmissions in an outdoor environment are in some cases, subject to additional regulations, given a higher probability that outside transmissions will interference with other radio operations. One example modification changed a UNII-1 regulation in 2014, and required that any Wi-Fi frequency band used outdoors would have a maximum transmission power not exceeding 4 W EIRP for Wi-Fi access points (APs). This regulation included two restrictions: First, transmission power must be reduced by one (1) decibel (dB) for every dB that an antenna gain exceeds 6 dBi. Second, the transmission power of an outdoor AP in a direction of 30 degrees above the horizon should be limited to 125 mW EIRP. Thus, these new regulations imposed a need to ensure that any AP deployed outside does not exceed the transmission power in a direction above the horizon. To comply with these requirements, many APs reduced the transmission power of their outdoor AP models to ensure that if the AP was not perfectly horizontally aligned, its transmission power in a direction above the horizon was still below the required threshold. In other words, the AP's were configured to operate at a maximum transmission power that was less than a transmitter hardware capability. Other solutions utilize a fine alignment process for their outdoor APs. This fine alignment process ensured an optimized alignment of the AP antenna(s) direction(s) to avoid violating applicable regulations. Other solutions enhanced their installations procedures and reduced the transmission power of an AP to ensure that if the AP swings or changes its orientation (e.g. because of a wind gust, aging tightening screws, temperature variation), the AP continued to comply with regulator guidelines.

The disclosed embodiments improve upon these solutions by integrating an orientation sensor and a radio transmitter into a device such as an access point. The orientation sensor is used to determine a position of the device relative to the horizon. From this information, an amount of antenna gain directed in a specific angle above the horizon is determined. Since antenna configurations vary across different models of devices, in some embodiments, the amount of antenna gain is based on a model specific mapping between at least one axis of orientation and the resulting antenna gain. A maximum transmission power of the device is then determined, based on the gain, so as to ensure that the amount of transmitted power above the horizon conforms with appropriate regulations.

In some environments, determination of a maximum transmission power is complicated by a changing orientation of a radio transmitter (e.g., within an access point). For example, in some cases, a device that includes a radio transmitter is mounted on a platform that has some flexibility. As a result, the platform may move, changing an orientation of the device attached to it. For example, in some cases, a wireless access point is mounted to a streetlamp or cellular tower, which has some motion during windy conditions. In some cases, the motion of the radio transmitter is cyclical or oscillating in nature. For example, motion caused by wind imparting a sway into a platform upon which an access point is mounted can cause the platform to oscillate between two maximums. Since it is generally not practical to continuously update the maximum transmission power for a transient orientation of a radio transmitter under such circumstances, some of the disclosed embodiments instead determine, within a time series of orientation measurements, a single orientation measurement that represents an orientation that provides a largest percentage of transmitted power to be directed above the horizon. In other words, this single orientation represents a "worst case scenario" with respect to transmitted power above the horizon. To ensure the device complies with appropriate regulations, some embodiments determine a maximum transmit power based on this worst case scenario single orientation. By integrating an orientation sensor with a radio transmitter, a device is able to independently determine its orientation, without any human assistance or burdensome specialized installation requirements.

FIG. 1 is an overview diagram 100 of an example wireless system implemented in one or more of the disclosed embodiments. A building 105 houses a router 110 which connects a network to the internet 140 via a link 142.

Router 110 is connected to switch 112. The switch 112 provides a wired network connectivity to an outdoor access point (AP) 115 via a link 116. The outdoor AP 115 provides Wi-Fi connectivity to a smart phone 130 and to an IoT device, in the example of FIG. 1, the IoT device is wireless mobile equipment associated a vehicle 135.

During an installation, a technician attaches the AP 115 to an external structure, such as a street light 120. While the technician attempts to install the AP so that it is horizontally aligned, some deviation from a perfect alignment is to be expected. Furthermore, as discussed above, in some environments, the street light 120 sways under certain conditions (e.g., in a windy environment, or perhaps when a large truck passes by). Some streetlight designs may also experience variation based on temperature. For example, sunlight hitting one side of the street light 120 can cause an orientation of the AP 115 relative to a horizon 125 to vary slightly.

A network management system 150 is in networked communication with the router 110 via the Internet 140. In some embodiments, the AP 115 communicates orientation information received from an orientation sensor integrated with the AP itself to the network management system (NMS) 150. In these embodiments, the NMS 150 determines a maximum transmit power of the AP 115 based on the orientation information, and then provides the maximum transmit power back to the AP 115. In other embodiments, the AP 115 determines the maximum transmit power locally, without assistance from the NMS 150. In some instances, the AP 115 receives configuration information from the NMS indicating a transmit power greater than a locally determined maximum transmit power. In some embodiments, the AP 115 enforces a maximum transmit power in accordance with its locally determined maximum transmit power even if the NMS 150 indicates a greater transmission power for the AP 115.

In some embodiments, the maximum transmit power is communicated to a radio resource manager (RRM). The RRM then determines a transmit power for one or even a plurality of APs in some embodiments, while ensuring the determined transmit power of APs managed by the RRM stay below the maximum transmit power.

Figure 2:
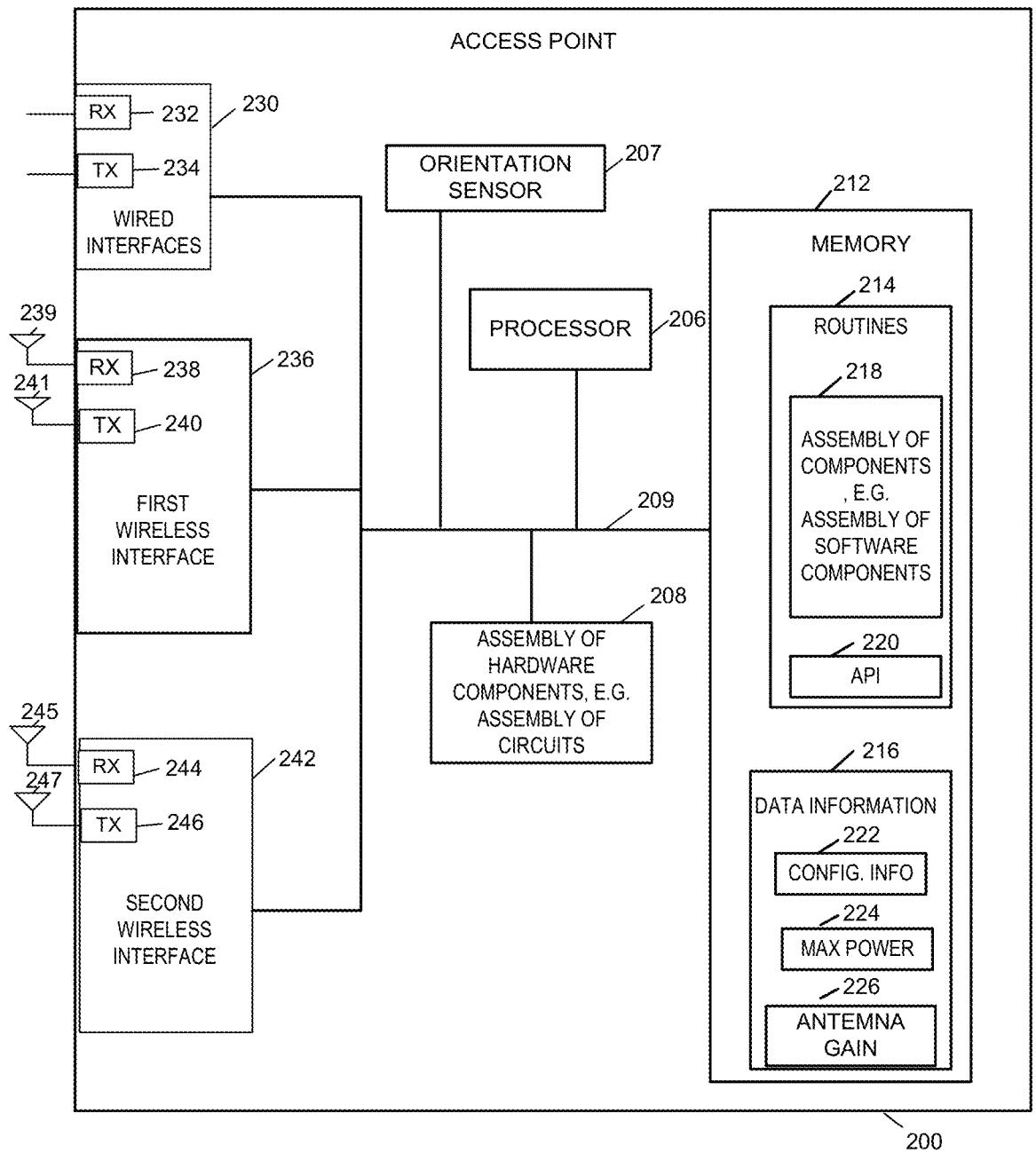
FIG. 2 is a block diagram of an example access point implementing one or more of the disclosed embodiments.

FIG. 2 is a block diagram of an example access point implemented in one or more of the disclosed embodiments. configured to implement one or more of the disclosed embodiments. The AP 200 shown in FIG. 2 is analogous to any of the APs referenced in this disclosure, including, for example, the AP 115 discussed above with respect to FIG. 1.

The example AP 200 includes a wired interface 230, wireless interfaces 236, 242, a hardware processor 206, e.g., a central processing unit (CPU), an orientation sensor 207, a memory 212, and an assembly of components 208, e.g., assembly of hardware components, e.g., assembly of circuits, operably coupled via a bus 209 over which the various elements may interchange data and information. Wired interface 230 includes receiver 232 and transmitter 234. The wired interface couples the AP 200 to a network and/or the Internet 140 of FIG. 1 e.g., via switch port such as a port of the switch 112 of FIG. 1. First wireless interface 236, e.g., a wireless a Wi-Fi interface, e.g. 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242, e.g., a Bluetooth interface, includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data 216. Routines 214 include an assembly of components 218, which includes, in some embodiments, an assembly of software components or instructions, and instructions implementing an Application Programming Interface (API) 220. The data 216 includes configuration information 222, a maximum transmission power 224, and data indicating antenna lobe gains 226. In some embodiments, the antenna lobe gains 226 are used to determine a gain of an antenna in different relative directions. For example, some embodiments determine an antenna gain in a direction above the horizon to ensure compliance with applicable regulations.

In some embodiments, instructions included in the routines 214 configure the hardware processor 206 to determine a maximum transmit power of the AP 200 based on an orientation of the AP 200. The orientation is read by the instructions from the orientation sensor 207. In some embodiments, other instructions included in the routines 214 then limit a maximum transmission power of the AP 200 to the determined maximum transmit power. In some embodiments, data from the orientation sensor 207 is provided, via for example, one of the wired interfaces 230, a first wireless interface 236 or a second wireless interface 242, to the NMS 150, discussed above with respect to FIG. 1.

Figure 3:
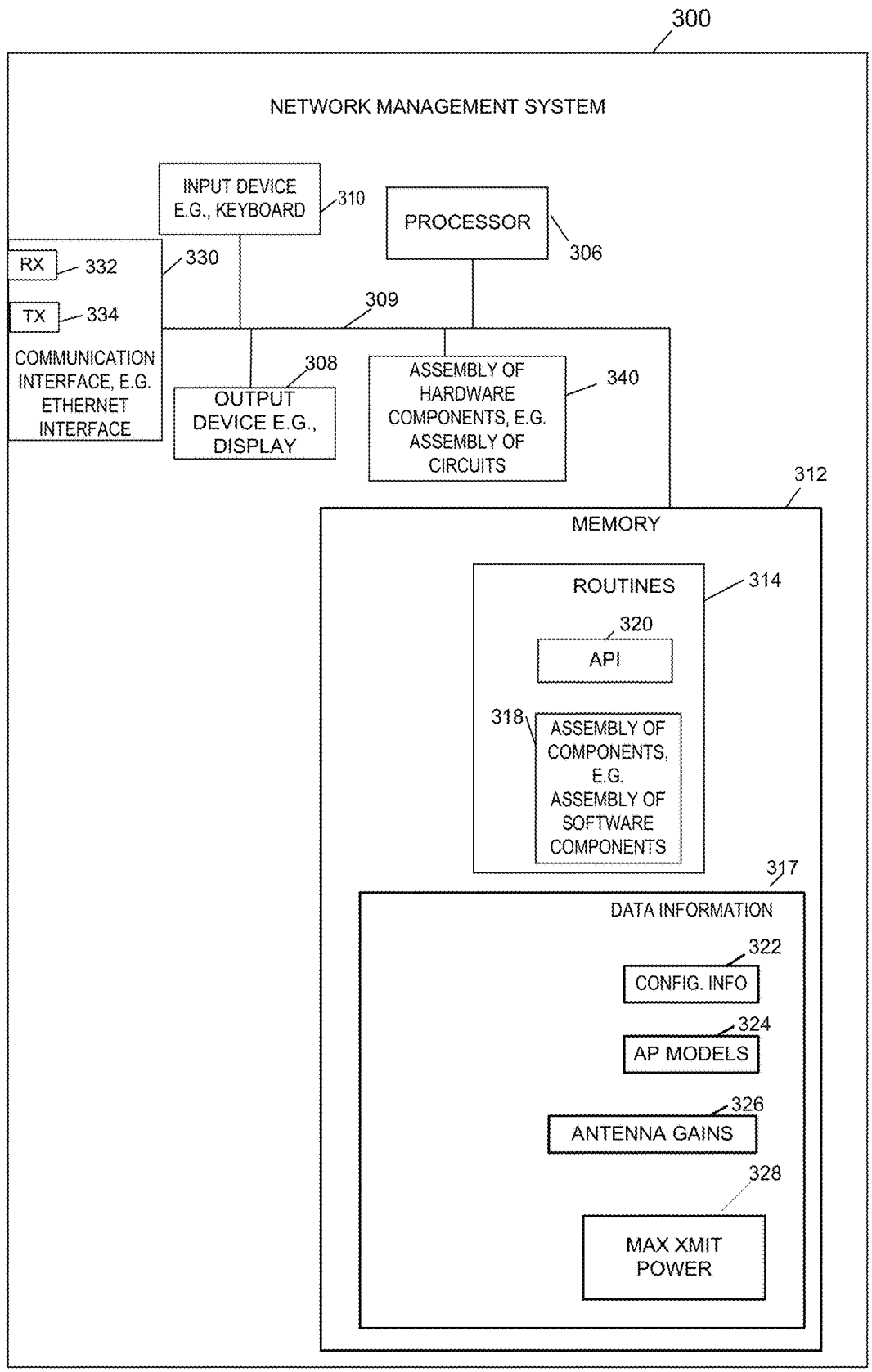
FIG. 3 is a block diagram of an example network management system implementing one or more of the disclosed embodiments.

FIG. 3 is a block diagram of an example NMS 300. In some embodiments, the NMS 300 is analogous to the NMS 150 discussed above with respect to FIG. 1, or any NMS referenced in this disclosure.

As discussed above with respect to FIG. 3, in some embodiments, a network management systems assists a network device, such as an AP, in determining a maximum transmission power.

In one or more of the disclosed embodiments, the network management apparatus implements a maximum transmission power setting for outdoor APs that determines a transmission power threshold that an AP should not exceed.

The example NMS 300 includes a communications interface 330, a hardware processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements may interchange data and information. The communications interface 330 includes an Ethernet interface in some embodiments. Communications interface 330 couples the NMS 300 to a network and/or the Internet. Communications interface 330 includes a receiver 332 via which the network monitoring apparatus can receive data and information, e.g., including service related information, e.g., messages from a variety of devices such as AAA server, DHCP server, Web server (for simplicity not shown), routers, switches, and a transmitter 334, via which the NMS 300 can send data and information, e.g., including configuration information and instructions, e.g., instructions to access points (e.g., instructions to change maximum allowed transmission power), routers, switches, or any other server attached to the network, to restart, change operating parameters, download and install another SW version, etc.

Memory 312 includes routines 314 and data/information 317. Routines 314 include assembly of components 318, e.g., an assembly of software components, and an API 320. Data/information 317 includes configuration information 322, model specific AP information 324, antenna gain information 326, and maximum transmit power limit information 328.

The model specific AP information includes 324, in some embodiments, a number of antennas supported by the particular AP model, their relative position and orientation on the AP model, and a type indicator of each antenna. In some embodiments, the model specific AP information 324 also indicates whether each of the antennas is adjustable in its position relative to the AP, and a range of any such adjustment. Characteristics of a radio transmitter of the particular model of AP are also indicated in at least some embodiments of the model specific AP information 324.

The antenna gain information 326 includes information relating to a directional gain of various antenna types. The directional gain of an antenna relates, in some embodiments, to a shape of one or more lobes of the antenna. In some embodiments, the data/information 317 includes maximum transmit power information 328 storing computed maximum transmit powers for one or more APs managed by the NMS 300.

In some embodiments, instructions included in the routines 314 receive orientation information from an access point. The orientation information indicates the AP's position relative to the horizon. The NMS 300 also receives, in some embodiments, information from the AP indicating the APs model information. In accordance with another example implementation, the model information, or a portion of this information, is obtained via system configuration. The model information includes, in some embodiments, an indication of a manufacturer of the device (e.g., an AP) and/or an indication of a model number or name of the device.

In some embodiments, the instructions included in the routines 314 configure the hardware processor 306 to determine a maximum transmit power of the AP based on the orientation information (and in some embodiments, the model information). The determined maximum transmit power is then communicated to the AP. The AP then limits its transmission power accordingly.

Figure 4A:
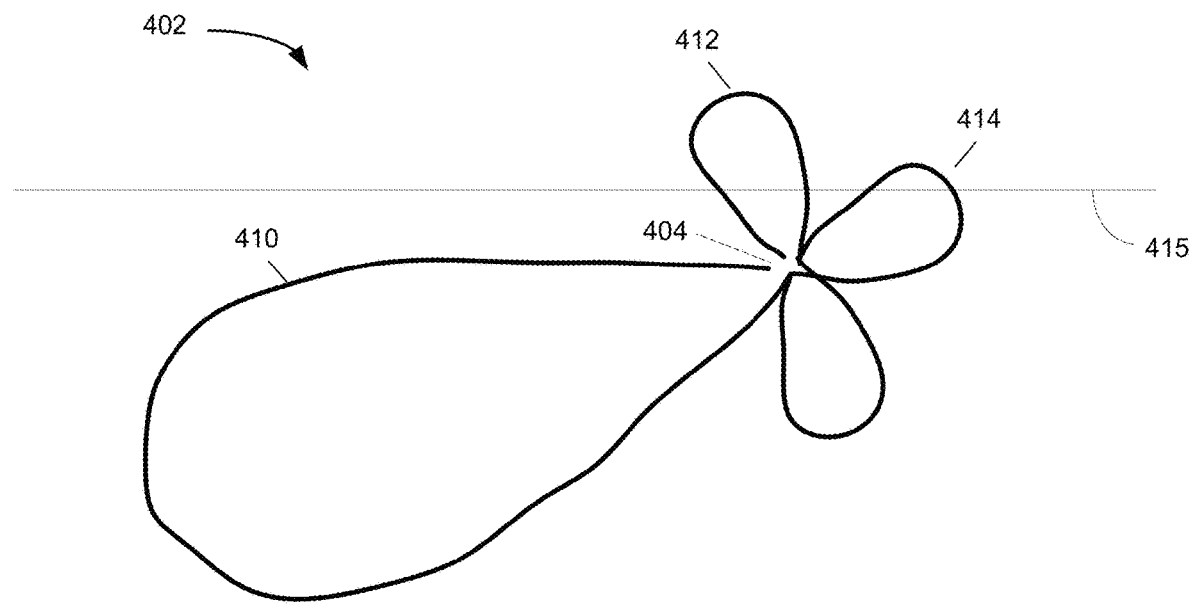
FIGS. 4A-4B illustrate positions of an antenna relative to a horizon.
Figure 4B:
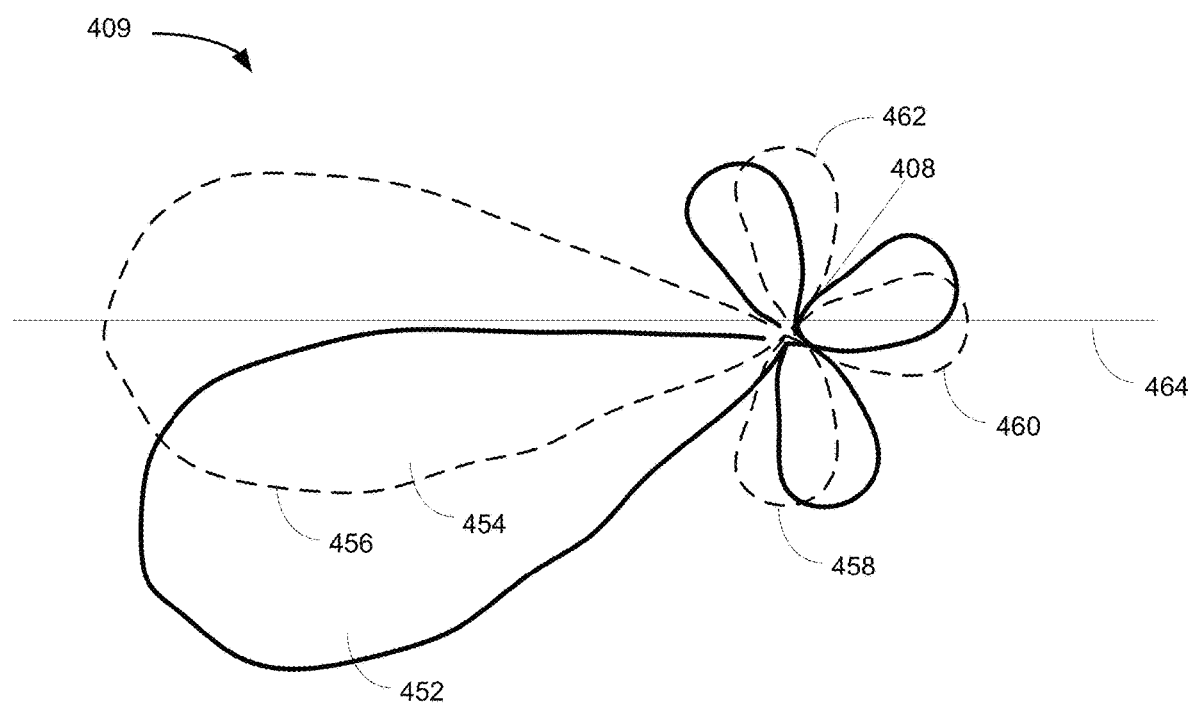

FIGS. 4A-B illustrate example antenna positions implemented in one or more of the disclosed embodiments. FIG. 4A shows the lobe of a first antenna orientation 402, of an antenna 404. The first antenna orientation 402 of the antenna 404 represents a lobe of an antenna of a properly installed AP. A result of proper installation is that an antenna main lobe 410 of the antenna 404 is pointing primarily in a downward direction, away from the horizon 415. An antenna might be installed in the first antenna orientation 402 if the antenna 404 is installed at a location that is generally higher than devices the antenna 404 is intended to service.

In the first antenna orientation 402 of FIG. 4A, other lobes of the antenna 404, such as a second lobe 412, or a third lobe 414 point above the horizon 415. Thus, even when the antenna 404 is properly positioned, the disclosed embodiments recognize that a need remains to avoid transmitting too much power with the antenna 404. Transmitting at too high a power level could cause power emitted by one or more of the second lobe 412 and/or the third lobe 414 to exceed a regulatory limit.

FIG. 4B illustrates two different orientations of an antenna 409. A first orientation 452 is equivalent to the orientation 402 discussed above with respect to FIG. 1. A second orientation 454 represents a rotation of the antenna 408 relative to the first orientation 452. In the second orientation 454, each of the first antenna lobe 456, second antenna lobe 458, third antenna lobe 460, and fourth antenna lobe 462 may direct some transmit power above a horizon 464. However, the power directed above the horizon in the second orientation 454 is different than the power directed above the horizon in the first orientation 452. Thus, at least some of the disclosed embodiments determine a total power generated by each of the first antenna lobe 456, second antenna lobe 458, third antenna lobe 460, and fourth antenna lobe 462 (in this example), and how much of the power generated by each of the lobes is directed above a specific angle relative to the horizon 464.

Figure 5:
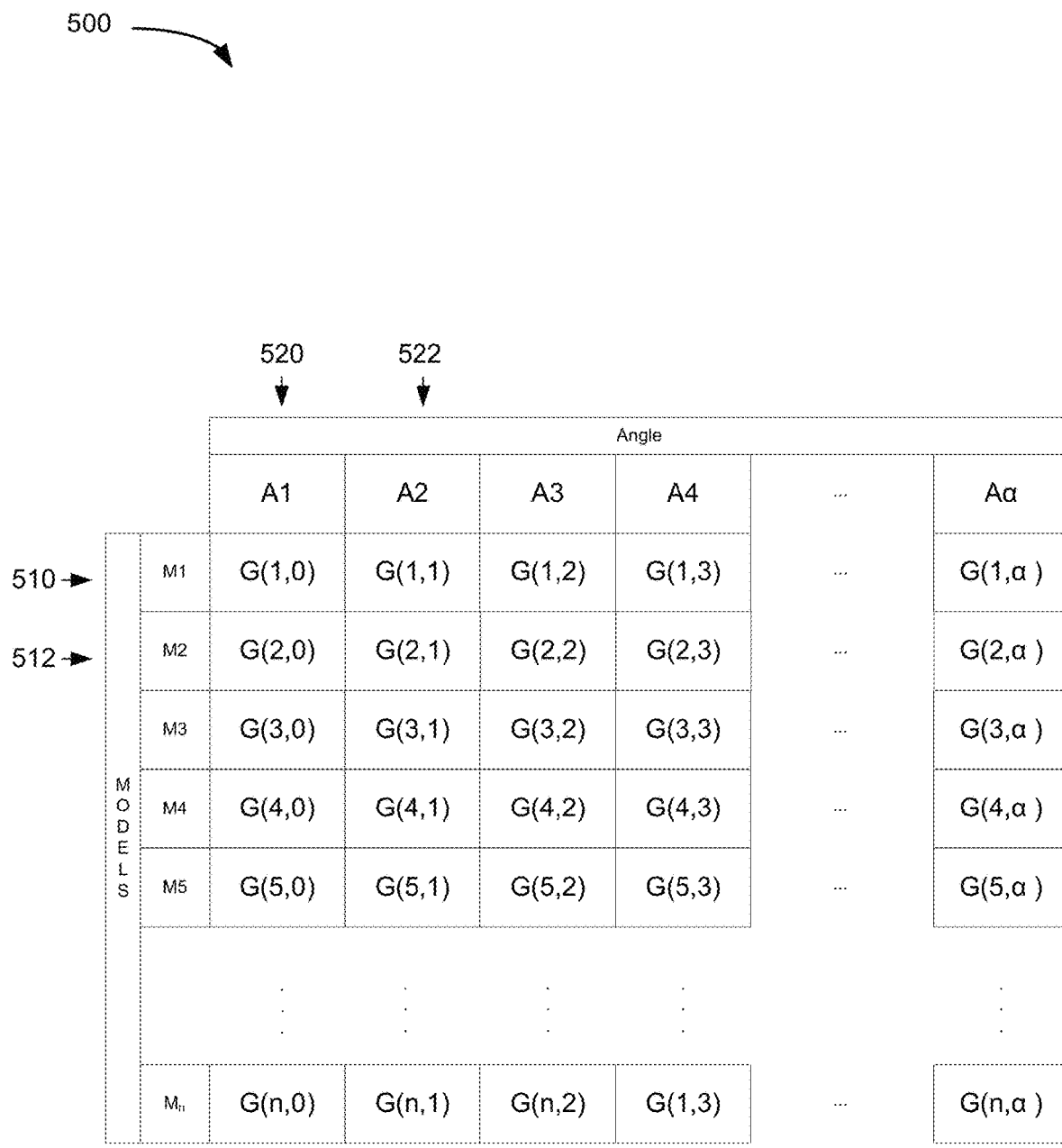
FIG. 5 shows an example organization of antenna gain information.

FIG. 5 illustrates example antenna gain information. Antenna gain information is a function, in various embodiments, of an orientation of a device with respect to one or more dimensions (e.g. one or more of pitch, yaw, orroll). Gain dependency based on roll angle depends, at least in some cases, on a symmetry of an antenna. Some embodiments store antenna gain information as a table, such as the example table 500 of FIG. 5. For ease of illustration, The gain information stored in the table 500 considers only a single dimension (shown as "angle"). However, other embodiments consider at least two dimensions when determining gain information for a particular orientation.

Table 500 includes antenna gain information for a plurality of different device models in rows of the table 500. For example, a row 510 provides antenna gain information for a model "M1", while row 512 provides antenna gain information for a model "M2." Gain information for different angles of incidence of the antenna with a horizon are provided in columns of table 500. For example, a column 520 provides gain information for an angle of incidence A1 while column 522 provides gain information for an angle of incidence A2. A granularity of angles provided in the tables varies by embodiment. Some embodiments provide information defining angles of incidence for 180 different angles. Other embodiments provide courser or finer granularities of angle of incidence information.

In some embodiments, gain information includes a cumulative gain multiplier indicating an aggregated gain of the antenna in all directions above a specific angle above the horizon based on an angle at which a device (e.g., an AP model of which is indicated in a row of the table 500) is installed.

In some other embodiments, constant gain values are not stored as part of the gain information. Instead, gain information defines one or more equations that are evaluated to compute a gain of an antenna in a specific direction. Input to the equation includes, in some embodiments, a model number of the device, and an orientation of the device with respect to a horizon.

In some embodiments, any of the embodiments of gain information discussed above is stored as part of data 216 (e.g. by an access point) and/or as part of antenna gain information 326 (e.g. by NMS 150 and/or NMS 300).

Figure 6:
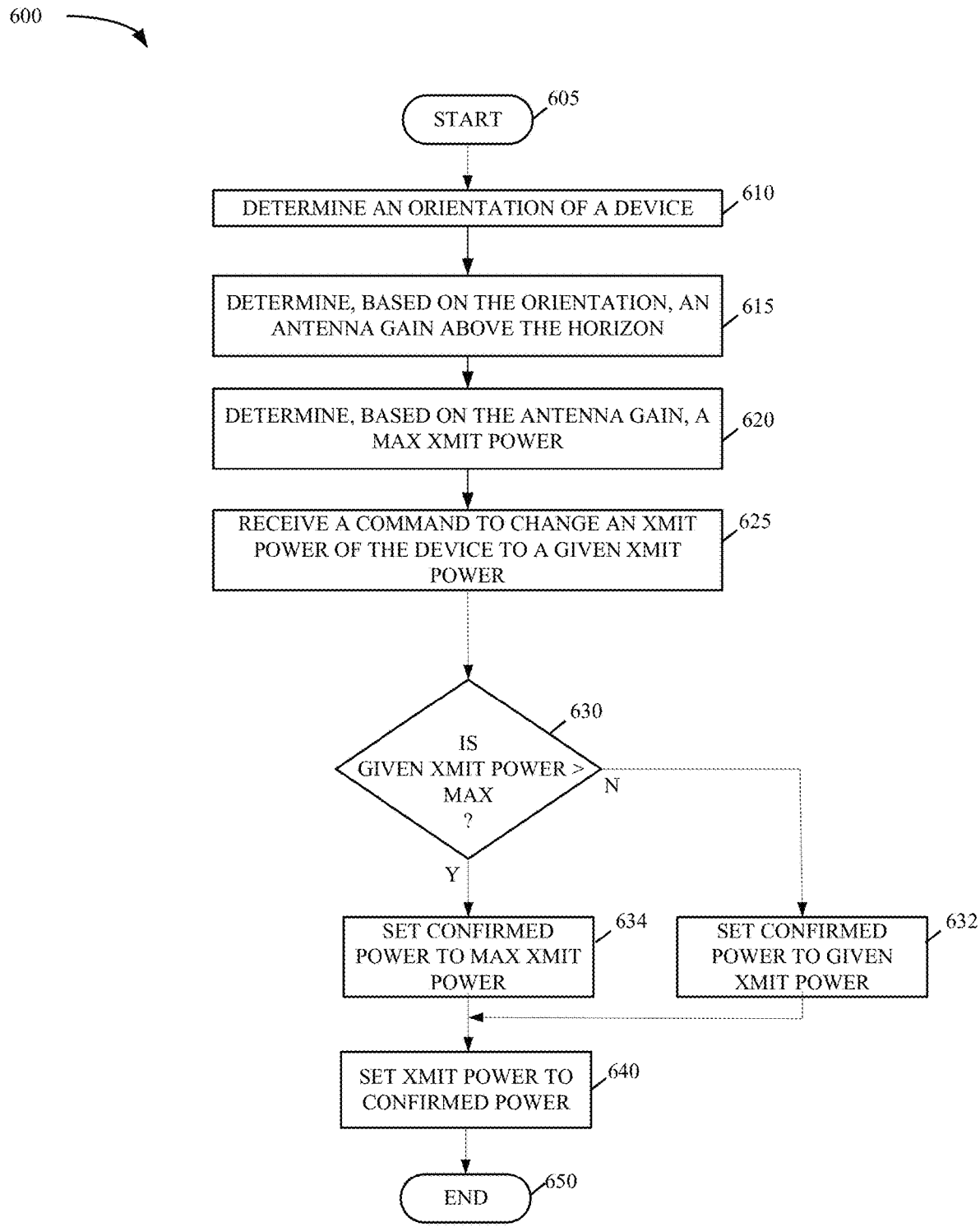
FIG. 6 is a flowchart of an example method for determining a maximum transmission power of a device.

FIG. 6 is a flowchart of an example method for determining a maximum transmission power of a device. In some embodiments, the method 600 discussed below with respect to FIG. 6 is performed by hardware processing circuitry, such as the hardware processor 206 or the hardware processor 306. For example, in some embodiments, instructions stored in the memory 212 or the memory 312 configure the respective hardware processor (e.g., hardware processor 206 or hardware processor 306) to perform one or more of the functions discussed below with respect to FIG. 6. In some embodiments, the method 600 is performed by an access point or by a network management system. A device performing the method 600 is referred to below as an "executing device."

Method 600 begins at start operation 605 and then moves to operation 610. In operation 610, an orientation of a device is determined. In some embodiments, the device is an access point. In some embodiments, (e.g., in embodiments where an access point performs the method 600), determining an orientation of the device includes reading orientation information from an orientation sensor integrated with the device. In some embodiments, determining the device orientation includes receiving a message from the device indicating the orientation, and then decoding the message to determine the orientation. In some embodiments, the orientation includes relative angular offsets of the device's orientation with respect to a reference orientation in a coordinate system including three different axes (e.g., x, y, and z axis). In some embodiments, one of those three axes is aligned with the earth's horizon or the ground.

In operation 615, an antenna gain directed above a predetermined angle above the horizon is determined based on the device's orientation. For example, as discussed above, some embodiments utilize antenna gain information, such as the antenna gain information discussed above with respect to FIG. 5, to determine a portion of transmit power directed above a predefined angle above the horizon based on the orientation of the device. Thus, in those embodiments that store predefined gain constants in a data store such as the table 500 discussed above with respect to FIG. 5, operation 615 searches the data store to identify an antenna gain constant appropriate for the determined orientation of the device. In some embodiments, the determination is also based on information identifying a configuration of the device, such as a number of antennas of the device and position(s) of the antenna(s) relative to an orientation of the device itself. As discussed above, in some embodiments, the configuration information is identified based on manufacturer and/or model number information of the device.

In operation 620, a maximum transmit power (or in other words, a transmit power limit) of the device is determined such that transmissions of the device do not direct more than a predefined amount of transmit power above a predefined angle above the horizon. Some embodiments determine a power transmitted above a predefined angle above the horizon in accordance with Equation 1 below:

$$\text{ATH Power} = \text{Xmit Power} * \text{ATH Gain} \quad \text{Equ. 1}$$

where:
ATH Power a power transmitted above the horizon (ATH),
Xmit Power a transmit power at an output of the transmitter, and
ATH Gain a gain of the antenna that is directed above a predefined angle above the horizon.

In some embodiments, a maximum transmit power is then determined based on Equation 2 below:

$$\text{MAX}T = \text{Threshold PWR}/\text{ATH Gain} \quad \text{Equ. 2a}$$

where
MAXT a maximum allowed transmitter power,
Threshold PWR a threshold of the maximum allowed transmission power above the horizon, and
ATH Gain a gain of the antenna directed above the horizon.
Or in the dBm domain $$\text{MAX}T = \text{Threshold PWR} - \text{ATH Gain} \quad \text{Equ. 2b}$$

In some embodiments, rather than using a maximum transmit power according to Equations 2a-b (which relies on a measured orientation), a determination is made as to whether a calculated MAXT is greater than a previously set MAXT. These embodiments then select the larger of the two determined MAXT values. This approach is presented in Equation 3 below:

$$\text{MAX}T(t) = \text{Max}\{\text{MAX}T(t-1), \text{Threshold PWR}/\text{ATH Gain}(t-1)\} \quad \text{Equ. 3}$$

where:
MAXT (t) a maximum allowed transmitter power at time t
Max {a, b} a maximum function with input values of a and b
ATH Gain (t) a gain of the antenna directed above the horizon at time t.

In some embodiments, a transmit power of the device is limited based on the determined maximum transmit power. For example, when method 600 is performed by an AP, the AP limits its own transmission power according to the determined maximum transmit power. When method 600 is performed by a NMS, the NMS sends a message to the AP indicating it should limit its power according to the determined power limit.

Operation 625 receives a command to change a transmit power of the device to a new transmit power. For example, when method 600 is performed by an AP, the AP receives a message, in some embodiments, from an NMS, or from a radio resource manager (RRM), indicating it should increase its transmission power. Alternatively, when method 600 is performed by an NMS, the NMS can receive, in some embodiments, a message from another device (e.g., a radio resource manager) indicating an increase in transmit power of the AP is recommended or otherwise indicated.

Decision operation 630 compares the new transmit power to the previously determined maximum transmit power determined in operation 620. If the new transmit power exceeds the maximum transmit power, method 600 moves from decision operation 630 to operation 634, where a confirmed transmit power is set to the maximum transmit power. If the new transmit power is lower than the maximum transmit power, method 600 moves from decision operation 630 to operation 632, where the confirmed transmit power is set to the new transmit power. In either case, method 600 then moves to operation 640, where an operative transmit power is set to the confirmed transmit power. In other words, in operation 640, a signal is transmitted, at least in some embodiments, by the executing device according to the confirmed transmit power.

After operation 640 completes, method 600 moves to end operation 650. Note that in some embodiments, method 600 operates iteratively, in that each of operations 610-640 are performed repeatedly.

Figure 7:
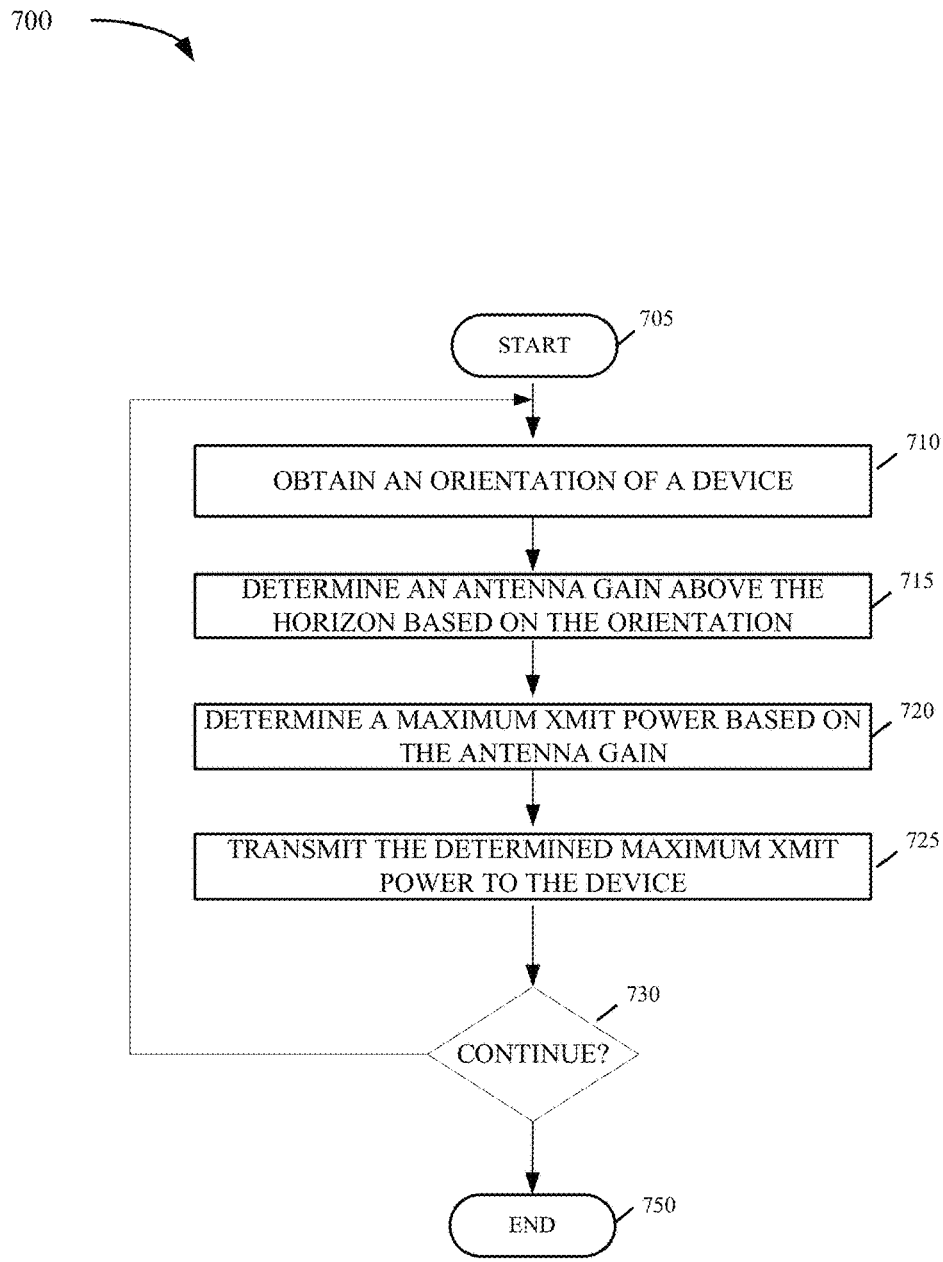
FIG. 7 is a flowchart of an example method for determining a maximum transmission power of a device whose orientation is stable.

FIG. 7 is a flowchart of an example method for determining a maximum transmission power of a device whose orientation is stable. In some embodiments, the method 700 discussed below with respect to FIG. 7 is performed by hardware processing circuitry, such as the hardware processor 206 or the hardware processor 306. For example, in some embodiments, instructions stored in the memory 212 or the memory 312 configure the respective hardware processor (e.g., hardware processor 206 or hardware processor 306) to perform one or more of the functions discussed below with respect to FIG. 7. In some embodiments, the method 700 is performed by an access point or by a network management system. A device performing the method 700 is referred to below as an "executing device."

Method 700 begins at start operation 705 and then moves to operation 710. In operation 710, an orientation of a device is obtained. In some embodiments, (e.g., when the executing device is an access point), the orientation is obtained from an orientation sensor integrated with the device itself. In some other embodiments, e.g., when the executing device is an NMS), the orientation is obtained from a network message received from the device. In some embodiments, the orientation includes relative angular offsets of the device with respect to a reference orientation in three axis (e.g., x, y, and z axis). One of the axis is parallel with the earth's horizon or with the ground.

In operation 715 an antenna gain is determined based on the orientation. In some embodiments, operation 715 consults or searches stored antenna gain information, such as the example antenna gain information discussed above with respect to FIG. 5. Thus, in some embodiments, operation 715 maps, in some embodiments, a model identification of the device to orientations of one or more antenna of the device based on an orientation of the device itself (e.g., the orientation obtained in operation 710). Once orientations of the antennas with respect to the horizon are known, operation 715 determines a gain of each antenna above a predefined angle above the horizon. The gains of each antenna are then aggregated. Based on this aggregated gain, an amount of transmit power directed above a predefined angle above the horizon by the device in the obtained orientation is determined.

In operation 720, a maximum transmit power (or in other words, a transmit power limit) is determined based on the gain of operation 715. In some embodiments, the maximum transmit power is determined so as to ensure an amount of transmit power directed above a predefined angle above the earth's horizon is below a predefined threshold. In some embodiments, the predefined threshold is set based on applicable regulations. In some embodiments, the determination of the maximum transmit power is performed in a manner consistent with the description of operation 620, discussed above.

In operation 725, the determined maximum transmit power is communicated (e.g. via transmission of a network message) to the device. For example, in some embodiments, either a radio resource manager or NMS determines the maximum transmit power for an access point, and then communicates that maximum transmit power to the access point.

Decision operation 730 determines whether method 700 should continue. The decision is based, in some embodiments, on whether a device executing the method 700 is shutting down or is continuing to operate. If the method 700 should continue, method 700 moves from decision operation 730 to operation 710, where the method repeats. Otherwise, method 70 moves from decision operation 730 to end operation 750.

Figure 8:
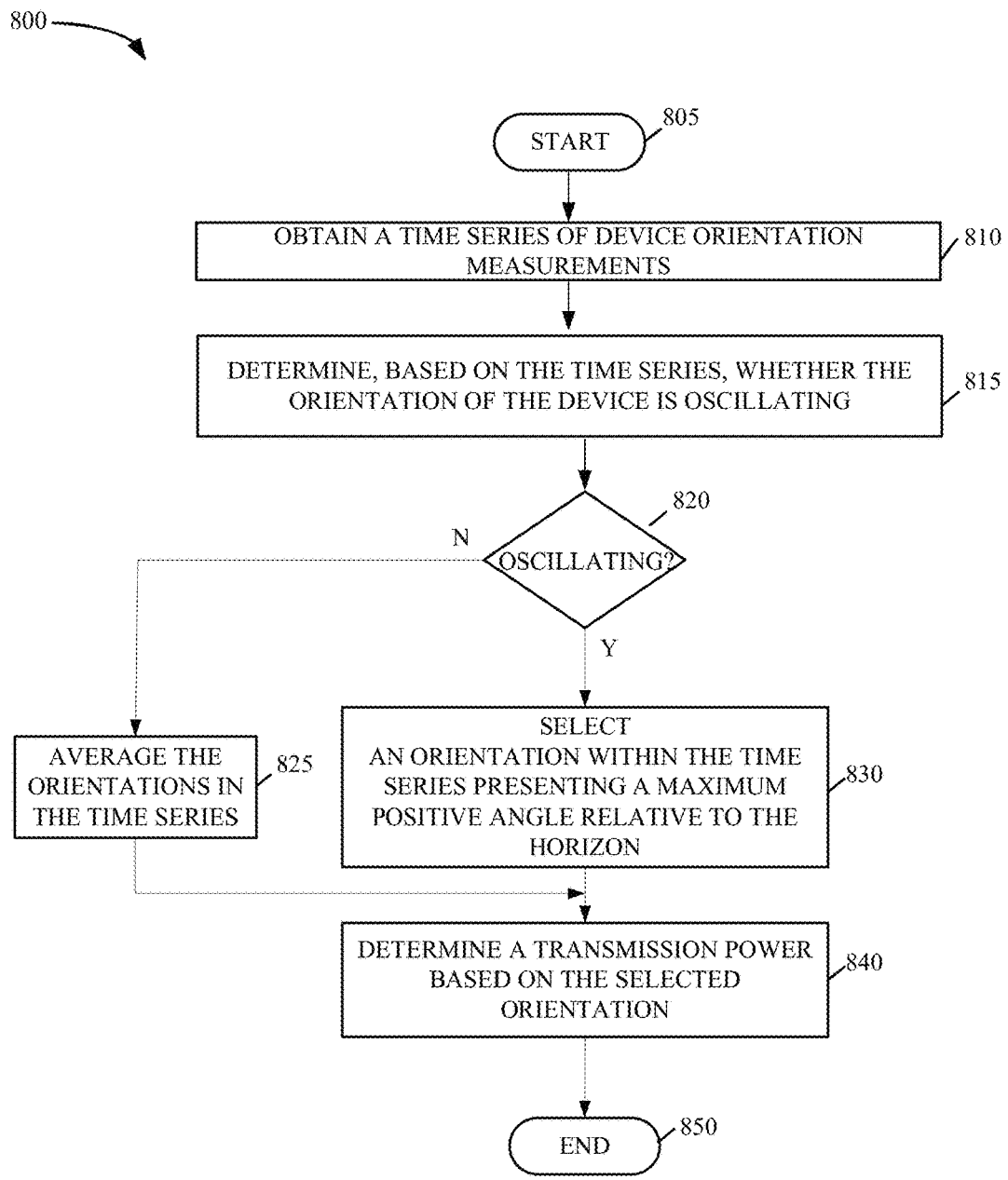
FIG. 8 is a flowchart of an example method for determining a maximum transmission power of a device whose orientation is not stable.

FIG. 8 is a flowchart of an example method for determining a maximum transmission power of a device whose orientation is not stable. In some embodiments, the method 800 discussed below with respect to FIG. 8 is performed by hardware processing circuitry, such as the hardware processor 206 or the hardware processor 306. For example, in some embodiments, instructions stored in the memory 212 or the memory 312 configure the respective hardware processor (e.g., hardware processor 206 or hardware processor 306) to perform one or more of the functions discussed below with respect to FIG. 8. In some embodiments, the method 800 is performed by an access point or by a network management system. A device performing the method 800 is referred to below as an "executing device."

Method 800 begins at start operation 805 and then moves to operation 810. In operation 810, a time series of device orientation measurements are obtained. The orientation measurements include, in some embodiments, a relative angle of a device with respect to three axis. One of the three axis is consistent with the earth's horizon in some embodiments. In some embodiments, the orientation measurements are obtained from an orientation sensor integrated with the device (e.g., when the executing device is the AP 115). In other embodiments, the orientation measurements are obtained via a network message sent by the device to another device, such as the NMS 150 (e.g., when the executing device is the NMS 150).

In operation 815, a determination is made as to whether the device's orientation is oscillating. The determination is based on the time series of orientation measurements obtained in operation 810.

In some embodiments, a difference in orientation measurements within the time series is compared to a predefined threshold. If the difference is larger than a threshold, operation 815 determines the device is oscillating. Otherwise, operation 815 determines the device is not oscillating.

In other embodiments, frequencies of orientation measurements included in the time series are identified. Dominate frequencies of the frequencies are also identified. If an amplitude of one or more of the dominate frequencies are determined to be above a predefined amplitude threshold, then operation 815 determines the device is oscillating. Otherwise, operation 815 determines the device is not oscillating.

Decision operation 820 determines if the device was found to be oscillating by operation 815. If no oscillation was found, method 800 moves from decision operation 820 to operation 825, where an average of orientation measurements within the time series is determined. By averaging the orientation measurements, noise or other artifacts included in the measurements are minimized. Other embodiments of operation 825 select an orientation within the time series at random.

If oscillation was detected, then the method 800 moves from decision operation 820 to operation 830, which selects an orientation within the time series that represents a maximum positive angle of an antenna relative to the earth's horizon. This maximum positive angle represents a "worst case scenario" imposed by the oscillation. Some embodiments consult antenna gain information, such as the example antenna gain information in the table 500 of FIG. 5 to determine a gain of the antenna above a predefined angle to the earth's horizon for each angle present in the time series. This allows the maximum gain presented by the oscillation to be identified, and for a maximum transmit power defined based on this maximum gain.

Method 800 moves from either the operation 825 or the operation 830 to operation 840, where a maximum transmission power (or in other words, a transmit power limit) is determined based on the orientation determined in either operation 825 or operation 830. In some embodiments, the maximum transmission power of operation 825 is determined in a manner consistent with the description above with respect to operations 620 or 720.

Some embodiments, when oscillation is detected, do not increase or otherwise inhibit an increase in a transmit power limit until a predefined number of contiguous orientation determinations indicate such an increase is warranted. These embodiments operate in this manner to ensure the limit is not set too high for a device that is oscillating. By ensuring a minimum number of contiguous orientations indicate the increased limit is warranted, the disclosed embodiments provide for an opportunity to detect oscillation if it is present.

While the description of FIG. 8 above describes detection of an oscillation by examining a plurality of orientation measurements (e.g. those orientation measurements present in a time series of orientation measurements), some embodiments alternatively, or in addition to, operate on each orientation measurement individually. Thus, as a time series of orientation measurements is received, the method 800 continuously modifies the maximum transmit power to adapt to the changed orientation. In these implementations, a constant orientation will result in a stable maximum transmit power.

After operation 840 completes, the method 800 moves to end operation 850.

The techniques of various embodiments may be implemented using software, hardware and/or a combination of software and hardware. Various embodiments are directed to apparatus, e.g., mobile nodes, mobile wireless terminals, base stations, e.g., access points, communications system. Various embodiments are also directed to methods, e.g., method of controlling and/or operating a communications device, e.g., wireless terminals (UEs), base stations, control nodes, access points and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the one example aspect.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of this disclosure. The methods and apparatus may be, and in various embodiments are, used with BLE, LTE, CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 2.4 Ghz, 5 GHz and/or 60 GHz. However, other embodiments may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The example embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the example embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the example embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The example embodiments are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

Example 1 is a method performed by hardware processing circuitry, comprising: determining an orientation of an access point (AP); determining, based on the orientation, a transmit power limit of the access point; and limiting transmission of the access point in accordance with the transmit power limit.

In Example 2, the subject matter of Example 1 optionally includes receiving a command to transmit at a first transmit power; determining the first transmit power exceeds the transmit power limit; and inhibiting transmission at the first transmit power based on the determining.

In Example 3, the subject matter of Example 2 optionally includes determining a gain of an antenna based on the orientation; and determining, based on the gain, the transmit power limit.

In Example 4, the subject matter of Example 3 optionally includes determining a model identifier of the access point, wherein the determining of the gain of the antenna is based on the model identifier.

In Example 5, the subject matter of any one or more of Examples 1-4 optionally include searching, based on the orientation, a data store; determining, based on the search, an antenna gain; and determining, based on the antenna gain, the transmit power limit.

In Example 6, the subject matter of any one or more of Examples 1-5 optionally include wherein limiting transmission of the access point comprises: generating a message indicating the transmit power limit; and sending the message to the access point.

In Example 7, the subject matter of any one or more of Examples 1-6 optionally include wherein limiting transmission of the access point comprises: generating a message indicating the transmit power limit; and sending the message to a radio resource manager configured to control the access point.

In Example 8, the subject matter of any one or more of Examples 1-7 optionally include detecting a change in the orientation; determining a second transmit power limit based on the change, and limiting transmission of the access point in accordance with the second transmit power limit.

In Example 9, the subject matter of any one or more of Examples 1-8 optionally include inhibiting an increase in the transmission power until a predefined number of contiguous orientation determinations indicate a particular maximum transmission power.

In Example 10, the subject matter of any one or more of Examples 1-9 optionally include determining, based on a time series of orientation measurements, the AP is oscillating; and in response to the oscillation: determining, based on each orientation measurement within the time series of orientation measurements, an antenna gain above a predefined angle to a horizon, and determining a maximum of the determined antenna gains within the oscillation, wherein the determining, based on the orientation, the transmit power limit of the access point is based on the maximum antenna gain within the oscillation.

In Example 11, the subject matter of Example undefined optionally includes, further comprising determining, based on a second time series of orientation measurements, the AP is not oscillating, and increasing the transmit power limit based on the determination.

In Example 12, the subject matter of Example undefined optionally includes, the operations further comprising: receiving a command to transmit at a first transmit power; determining the first transmit power exceeds the transmit power limit; and inhibiting transmission at the first transmit power based on the determining.

In Example 13, the subject matter of Example 12 optionally includes the operations further comprising: determining a gain of an antenna based on the orientation; and determining, based on the gain, the transmit power limit.

In Example 14, the subject matter of Example 13 optionally includes the operations further comprising determining a model identifier of the access point, wherein the determining of the gain of the antenna is based on the model identifier.

In Example 15, the subject matter of Example undefined optionally includes, the operations further comprising: searching, based on the orientation, a data store; determining, based on the search, an antenna gain; and determining, based on the antenna gain, the transmit power limit.

In Example 16, the subject matter of Example undefined optionally includes, wherein limiting transmission of the access point comprises: generating a message indicating the transmit power limit; and sending the message to the access point.

In Example 17, the subject matter of Example undefined optionally includes, wherein limiting transmission of the access point comprises: generating a message indicating the transmit power limit; and sending the message to a radio resource manager configured to control the access point.

In Example 18, the subject matter of Example undefined optionally includes, the operations further comprising: detecting a change in the orientation; determining a second transmit power limit based on the change, and limiting transmission of the access point in accordance with the second transmit power limit.

In Example 19, the subject matter of Example undefined optionally includes, the operations further comprising inhibiting an increase in the transmission power until a predefined number of contiguous orientation determinations indicate a particular maximum transmission power.

In Example 20, the subject matter of Example undefined optionally includes, the operations further comprising: determining, based on a time series of orientation measurements, the AP is oscillating; and in response to the oscillation: determining, based on each orientation measurement within the time series of orientation measurements, an antenna gain above a predefined angle to a horizon, and determining a maximum of the determined antenna gains, wherein the determining, based on the orientation, the transmit power limit of the access point is based on the maximum.

In Example 21, the subject matter of Example undefined optionally includes, the operations further comprising determining, based on a second time series of orientation measurements, the AP is not oscillating, and increasing the transmit power limit based on the determination.

Example 22 is a non-transitory computer readable storage medium comprising instructions that when executed configure hardware processing circuitry to perform operations comprising: determining an orientation of an access point (AP); determining, based on the orientation, a transmit power limit of the access point; and limiting transmission of the access point in accordance with the transmit power limit.

In Example 23, the subject matter of Example 22 optionally includes the operations further comprising: receiving a command to transmit at a first transmit power; determining the first transmit power exceeds the transmit power limit; and inhibiting transmission at the first transmit power based on the determining.

In Example 24, the subject matter of Example 23 optionally includes the operations further comprising: determining a gain of an antenna based on the orientation; and determining, based on the gain, the transmit power limit.

In Example 25, the subject matter of Example 24 optionally includes the operations further comprising determining a model identifier of the access point, wherein the determining of the gain of the antenna is based on the model identifier.

In Example 26, the subject matter of any one or more of Examples 22-25 optionally include the operations further comprising: searching, based on the orientation, a data store; determining, based on the search, an antenna gain; and determining, based on the antenna gain, the transmit power limit.

In Example 27, the subject matter of any one or more of Examples 22-26 optionally include wherein limiting transmission of the access point comprises: generating a message indicating the transmit power limit; and transmitting the message to the access point.

In Example 28, the subject matter of any one or more of Examples 22-27 optionally include wherein limiting transmission of the access point comprises: generating a message indicating the transmit power limit; and sending the message to a radio resource manager configured to control the access point.

In Example 29, the subject matter of any one or more of Examples 22-28 optionally include the operations further comprising: detecting a change in the orientation; determining a second transmit power limit based on the change, and limiting transmission of the access point in accordance with the second transmit power limit.

In Example 30, the subject matter of any one or more of Examples 22-29 optionally include the operations further comprising inhibiting an increase in the transmission power until a predefined number of contiguous orientation determinations indicate a particular maximum transmission power.

In Example 31, the subject matter of any one or more of Examples 22-30 optionally include the operations further comprising: determining, based on a time series of orientation measurements, the AP is oscillating; and in response to the oscillation: determining, based on each orientation measurement within the time series of orientation measurements, an antenna gain above a predefined angle to a horizon, and determining a maximum of the determined antenna gains, wherein the determining, based on the orientation, the transmit power limit of the access point is based on the maximum.

In Example 32, the subject matter of any one or more of Examples 22-31 optionally include the operations further comprising determining, based on a second time series of orientation measurements, the AP is not oscillating, and increasing the transmit power limit based on the determination.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the embodiment(s). Additionally, the example techniques illustrated herein are not limited to the specifically illustrated embodiments but can also be utilized with the other example embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A method comprising:
    obtaining, by hardware processing circuitry, an orientation measurement of an access point (AP), wherein the orientation measurement of the AP includes a position of the AP with respect to a reference position of the AP;
    determining, by the hardware processing circuitry, a gain of an antenna of the AP based on the orientation measurement;
    determining, by the hardware processing circuitry, a transmit power limit of the AP based on the gain of the antenna of the AP being above a predefined angle above a horizon defined by the reference position of the AP; and
    instructing, by the hardware processing circuitry, the AP to limit transmission power of the AP in accordance with the transmit power limit.

2. The method of claim 1, further comprising:
    receiving a command to transmit at a first transmit power;
    determining the first transmit power exceeds the transmit power limit; and
    inhibiting transmission at the first transmit power based on determining the first transmit power exceeds the transmit power limit.

3. The method of claim 1, wherein determining, by the hardware processing circuitry, the gain of the antenna of the AP is based on a model identifier of the AP.

4. The method of claim 1, wherein determining, by the hardware processing circuitry, the transmit power limit of the AP comprises:
    searching, by the hardware processing circuitry and based on the orientation measurement, a data store;
    determining, by the hardware processing circuitry and based on the search, the gain of the antenna of the AP is above the predefined angle above the horizon.

5. The method of claim 1, further comprising:
    obtaining, by the hardware processing circuitry, an indication of a change in the position of the AP;
    determining, by the hardware processing circuitry, a second transmit power limit based on the change; and
    instructing, by the hardware processing circuitry, the AP to limit transmission power of the AP in accordance with the second transmit power limit.

6. The method of claim 1, further comprising:
    determining the transmit power limit of the AP for a predefined number of contiguous orientation determinations; and
    inhibiting an increase in the transmission power of the AP until the predefined number of contiguous orientation determinations indicate a particular transmission power limit.

7. The method of claim 1, wherein determining, by the hardware processing circuitry, the transmit power limit of the AP comprises:
    determining, based on a time series of orientation measurements, the AP is oscillating; and
    in response to determining the AP is oscillating:
        determining, based on each orientation measurement within the time series of orientation measurements, a maximum gain of the antenna of the AP above the predefined angle above the horizon, and
        determining the transmit power limit of the AP based on the maximum gain of the antenna.

8. A computing system comprising processing circuitry having access to a storage device, the processing circuitry configured to:
    obtain an orientation measurement of an access point (AP), wherein the orientation measurement of the AP includes a position of the AP with respect to a reference position of the AP,
    determine a gain of an antenna of the AP based on the orientation measurement,
    determine a transmit power limit of the AP based on the gain of the antenna of the AP being above a predefined angle above a horizon defined by the reference position of the AP, and
    instruct the AP to limit transmission power of the AP in accordance with the transmit power limit.

9. The system of claim 8, wherein the processing circuitry is further configured to:
    receive a command to transmit at a first transmit power;
    determine the first transmit power exceeds the transmit power limit; and
    inhibit transmission at the first transmit power based on determining the first transmit power exceeds the transmit power limit.

10. The system of claim 8, wherein the determining of the gain of the antenna is based on a model identifier of the AP.

11. The system of claim 8, wherein to determine the transmit power limit of the AP, the processing circuitry is configured to:
    search, based on the orientation measurement, a data store;
    determine, based on the search, the gain of the antenna of the AP is above the predefined angle above the horizon.

12. The system of claim 8, wherein to instruct the AP to limit transmission power of the AP in accordance with the transmit power limit, the processing circuitry is configured to:
generate a message indicating the transmit power limit; and
send the message to the AP.

13. The system of claim 8, wherein to instruct the AP to limit transmission power of the AP in accordance with the transmit power limit, the processing circuitry is configured to:
generate a message indicating the transmit power limit; and
send the message to a radio resource manager configured to control the AP.

14. The system of claim 8, wherein the processing circuitry is further configured to:
obtain an indication of a change in the position of the AP;
determine a second transmit power limit based on the change; and
instruct the AP to limit transmission power of the AP in accordance with the second transmit power limit.

15. The system of claim 8, wherein the processing circuitry is further configured to:
determine the transmit power limit of the AP for a predefined number of contiguous orientation determinations; and
inhibit an increase in the transmission power of the AP until the predefined number of contiguous orientation determinations indicate a particular transmission power limit.

16. The system of claim 8, wherein to determine the transmit power limit of the AP, the processing circuitry is configured to:
determine, based on a first time series of orientation measurements, the AP is oscillating; and
in response to determining the AP is oscillating:
determine, based on each orientation measurement within the first time series of orientation measurements, a maximum gain of the antenna of the AP above the predefined angle above the horizon, and
determine the transmit power limit of the AP based on the maximum gain of the antenna.

17. The system of claim 16, wherein the processing circuitry is further configured to:
determine, based on a second time series of orientation measurements, the AP is not oscillating, and increase the transmit power limit based on the determination.

18. A non-transitory computer readable storage media comprising instructions that, when executed, are configured to cause processing circuitry to:
obtain an orientation measurement of an access point (AP), wherein the orientation measurement of the AP includes a position of the AP with respect to a reference position of the AP,
determine a gain of an antenna of the AP based on the orientation measurement,
determine a transmit power limit of the AP based on the gain of the antenna of the AP being above a predefined angle above a horizon defined by the reference position of the AP; and
instruct the AP to limit transmission power of the AP in accordance with the transmit power limit.

* * * * *